Patented Mar. 19, 1940

2,193,904

UNITED STATES PATENT OFFICE 2,193,904

PROCESS FOR THE MANUFACTURE OF SODIUM CITRATE PENTA-HYDRATE

Homer H. Holton, Corona, Calif., assignor to California Fruit Growers Exchange, Los Angeles, Calif., a corporation of California No Drawing. Application April 10, 1939, Serial No. 267,174

9 Claims. (Cl. 260—535)

This invention relates to a process for the preparation of sodium citrate penta-hydrate.

Sodium citrate is ordinarily made by adding sodium carbonate to a hot aqueous solution of citric acid. The resulting solution is then evaporated until crystallization takes place. A further method for producing sodium citrate is by decomposing calcium citrate by means of an alkali metal salt. However, since the normal sodium salt of citric acid is known to exist in two forms, namely, the di-hydrate $C_6H_5O_7Na_3 \cdot 2H_2O$ and the so-called penta-hydrate $$2(C_6H_5O_7Na_3) \cdot 11H_2O,$$

extreme care must be used in the manufacture of sodium citrate in order that mixtures of these two salts are not obtained.

Heretofore, in the production and manufacture of sodium citrate considerable difficulty has been experienced due to the fact that the processes used oftentimes result in products comprising a mixture of the two salts. This is obviously disadvantageous since the resulting product is of uncertain composition and properties.

Processes for the production of pure sodium citrate di-hydrate are disclosed in my co-pending application, Serial No. 175,855, filed November 22, 1937, now Patent No. 2,159,155. However, this present invention is directed toward the manufacture of sodium citrate penta-hydrate and more particularly to an improved method whereby this form of the salt may be manufactured free and separate from the di-hydrate form.

Accordingly, an object of this invention is to provide and disclose methods and means of producing sodium citrate penta-hydrate in substantially pure form.

Another object of this invention is to provide and disclose methods and means of producing sodium citrate penta-hydrate by means of vacuum crystallization.

These and other objects and advantages will be apparent from a description of the product and processes embodied in the specification and will present themselves to those skilled in the art in the contemplation and use of this invention.

I have found that it is possible to produce pure sodium citrate penta-hydrate from relatively impure aqueous solutions of citric acid or from relatively impure crystals of citric acid. I do not mean to imply, however, that my process is limited to those source materials, since, for instance, I may start with commercial citric acid either in the anhydrous or hydrated form.

The following procedure discloses the conditions under which sodium citrate penta-hydrate may be produced from relatively pure citric acid crystals.

A solution of the citric acid crystals is first made by dissolving the relatively pure citric acid crystals in water. The resulting liquor, which should preferably have a density of from 16 to 18 degrees Baumé, will in this case be comparatively free from impurities. Density of the starting liquor should be controlled within the above mentioned limits, since, in the subsequent neutralization step the density of the liquor increases by about 12 or 15 degrees Baumé. It at once becomes apparent to those skilled in this art that with a starting liquor having too great a density before neutralization the resulting reaction will be considerably slowed down and impeded by the lower solubility in high concentrations, as well as the greater amount of foaming which will take place at higher concentrations.

After the density of the starting liquor has been adjusted to within the proper range, the acid is preferably neutralized with anhydrous sodium carbonate, although either hydrate may be used. One may also use sodium bicarbonate or sodium hydroxide either in a dry form or in solution, as desired. I have found that it is important that the pH of the neutralized solution be carefully controlled. I have found further that the preferable range for the pH of the neutralized solution is between pH 5.70 and pH 6.20 as determined on a sample of the treated liquor diluted to 2.6 to 2.8 degrees Baumé at 25° C., when measured by means of a quinhydrone electrode in connection with a calomel half-cell. The subsequent operations will be facilitated if the pH at this stage is adjusted to between 6.03 and pH 6.15.

If, during the neutralization step, the liquor has become contaminated due to the introduction of foreign materials, the liquor should preferably be filtered. This may be done by any suitable means, as, for example, through a plate and frame filter press using a diatomaceous earth as a filter aid. The density of the neutralized and filtered liquor should now be about 28 to 34 degrees Baumé.

The aqueous solution of sodium citrate is placed in a vacuum pan and directly evaporated to a density of from 39 to 41 degrees Baumé or to about the graining-point. I have discovered that it is possible to concentrate the liquor above about 46° C. during the initial stage before the graining-point is reached, but that the temperature should be decreased to below about 46° C. before graining actually occurs. At the graining-point a careful control of the temperature should be maintained. The temperature should not be higher than about 46° C. and preferably below 45° C. The absolute pressure should be maintained below 2.6 inches. Under some circumstances it may be found necessary to decrease the absolute pressure in order to maintain the temperature below about 46° C. It is to be noted that if the temperature raises much above 46° C. and the absolute pressure increases above about 2.6 inches of mercury one will obtain sodium citrate di-hydrate.

As soon as graining has taken place, additional filtered liquor may be continuously drawn into the vacuum pan, whereupon continued crystallization of sodium citrate penta-hydrate will take place if the above mentioned conditions of temperature and absolute pressure are maintained. When a sufficiently large volume of magma has been produced in the vacuum pan, the liquor feed is shut off and the magma allowed to thicken to a desirable point. The crystal magma may then be dropped into a suitable jacketed mixer wherein the temperature of the mass is maintained below about 46° C. From the mixer the crystal mass is fed to a centrifuge wherein it is washed in the usual manner. The mother liquor and wash water may be returned to a holding tank where the pH is adjusted and the liquor filtered and recooked. The washed crystals are dried in a suitable manner. The sodium citrate penta-hydrate produced in accordance with the above disclosure tests not less than 99.5 per cent $$2(C_6H_5O_7Na_3) \cdot 11H_2O$$

and comes within the specifications for sodium citrate penta-hydrate as disclosed in the United States Pharmacopoeia No. VIII.

As mentioned before, it is understood that other materials may be used as the starting point for the production of sodium citrate penta-hydrate in accordance with the disclosures herein contained. Crude citric acid liquor made from impure citric acid may be purified in the usual manner and used as a starting material.

I have found further that the theoretical critical temperature at which the conversion from sodium citrate penta-hydrate to sodium citrate di-hydrate takes place is 46.0° to 46.5° C. as determined in a dilatometer using carbon tetrachloride. In practice I find, moreover, that as hereinbefore mentioned, the temperature at the graining-point should be maintained not above about 46° C. in order that one may be assured that the penta-hydrate will crystallize out.

It may be pointed out that a further advantage of the method as herein disclosed rests in the fact that the resulting crystals of sodium citrate penta-hydrate are very uniform in size and shape.

A still further advantage rests in that by the hereinabove disclosed method a simpler, quicker, cheaper method is provided by which substantially pure crystals of sodium citrate penta-hydrate may be made.

Having thus described my invention in such full, clear, concise, and exact language as to enable others skilled in the art to make and use the same, I claim as my invention and desire to secure by Letters Patent the following:

1. A process of obtaining sodium citrate penta-hydrate comprising evaporating an aqueous sodium citrate solution under an absolute pressure of less than 2.6 inches of mercury at a temperature not higher than 46° C.

2. A process of obtaining sodium citrate penta-hydrate which comprises concentrating an aqueous solution of sodium citrate under reduced pressure and at a temperature below 46° C., and cooling said concentrated solution to a temperature below 46° C.

3. A process of obtaining sodium citrate penta-hydrate comprising concentrating an aqueous solution of sodium citrate under an absolute pressure of less than 2.6 inches of mercury to about 45 degrees Baumé at a temperature below 46° C.

4. A process of obtaining sodium citrate penta-hydrate comprising concentrating an aqueous solution of sodium citrate to about 45 degrees Baumé under an absolute pressure of less than 2.6 inches of mercury, and cooling said concentrated solution at a temperature below 46° C.

5. A process of obtaining sodium citrate penta-hydrate comprising cooling an aqueous solution of sodium citrate of about 45 degrees Baumé to a temperature below 46° C.

6. A process of obtaining sodium citrate penta-hydrate which comprises evaporating an aqueous solution of sodium citrate under a reduced pressure of less than 2.6 inches of mercury and at a temperature lower than 46° C., continuing such evaporation until a satisfactory crop of sodium citrate penta-hydrate is obtained, removing the mother liquor from said crop of sodium citrate penta-hydrate crystals to obtain a mass of crystals of sodium citrate penta-hydrate.

7. A process of obtaining sodium citrate penta-hydrate comprising crystallizing sodium citrate from solution under reduced pressure and at a temperature not above 46.5° C.

8. A process of obtaining sodium citrate penta-hydrate which comprises evaporating an aqueous solution of sodium citrate under a reduced pressure and at a temperature above 46° C., continuing such evaporation until the solution is about to crystallize, continuing the concentration under a reduced pressure of less than 2.6 inches of mercury and at a temperature lower than 46° C. to obtain sodium citrate penta-hydrate crystals.

9. A process of obtaining sodium citrate penta-hydrate comprising crystallizing the sodium citrate from an aqueous solution under an absolute pressure of less than 2.6 inches of mercury, and at a temperature not higher than 46.5° C.

HOMER H. HOLTON.